Nov. 2, 1943.                C. P. DOUGHERTY                2,333,156
                               LATHE TOOL
                          Filed Feb. 16, 1942

Inventor
Charles P. Dougherty,

By McMorrow & Berman
Attorney.

Patented Nov. 2, 1943

2,333,156

UNITED STATES PATENT OFFICE 2,333,156

LATHE TOOL

Charles P. Dougherty, Auburn, N. Y.

Application February 16, 1942, Serial No. 431,145

1 Claim. (Cl. 29—103)

This invention relates to a lathe tool for accurately and rapidly cutting metallic work on the inside thereof and for carrying out a plurality of different kinds of cuts on the work in one operation of the lathe, and has for the primary object the provision of a tool of this character which may be easily and quickly made by a person skilled in tool making, and once adjusted for operation in the lathe, will accurately cut a maximum number of pieces of work without producing what is known as "scrap" or defectively cut work, and will require less skill in the use thereof and in the operation of the lathe and will permit production to be materially increased without placing excessive wear or burden on the lathe or additional work on the lathe operator.

Another object of this invention is the provision of a lathe tool of the character specified which will in one setting thereof make a plurality of selected kinds of cut in the work, eliminating the practice of employing separate tools for each cut made and the various settings for the different tools.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation, illustrating a tool in accordance with my invention.

Figure 3:
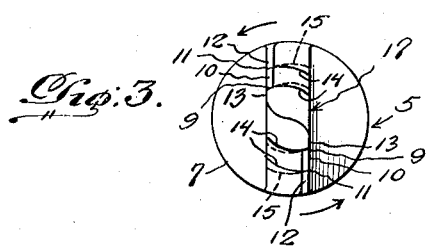
Figure 3 is an end view showing a modified form of my invention.

Referring in detail to the drawing, the numeral 5 indicates in entirety the tool forming the subject matter of this invention and consists of a shank 6 to be gripped by a lathe turret chuck and is integral with a solid cylindrical body 7. The shank 6 extends from one end face of the body and the other end face of said body has integral therewith, a cutting element 8 located eccentrically of the axes of the body and the shank. The axes of the body and the shank are common to each other, while the external diameter of the shank is less than the external diameter of the body.

In this instance, the cutting element 8 is shaped or constructed to present cutting edges 9, 10, 11, 12 and 13, all of which are arranged concentrically to each other and adapted to cut one after the other as the work is progressed by the lathe toward the cutting element. The cutting element 8 is further provided with a land 14 for each cutting edge, some of said lands are cut, as at 15, to provide clearance for cuttings, eliminating the possibility of the tool choking during its operation from cuttings.

A specification setting forth the cuts desired in a selected piece of work is followed in the making and arranging of the cutting edges with respect to each other. Different cuts desired in work will require different arrangement of the cutting edges with respect to each other. However, it will be understood whenever grouping of cutting edges is made, the tool will make all cuts in the work one after the other in one setting of the tool in the lathe turret.

In employing this tool, one swing of the lathe turret only is necessary to bring the tool in position for action on the work. The work is then advanced to the tool for the first cut and each succeeding cut thereafter, the work always moving in a plane paralleling the tool. Thus any person having very little knowledge of lathes and tool operations may successfully operate the lathe, so that large amounts of work may be completed accurately, eliminating any possibility of defective work occurring and allowing production of work to be increased to a maximum amount without increasing the speed of operation of the lathe over normal speed and places less work and effort on the part of the lathe operator.

All cutting edges shown are employed for cutting inside of the work, the cutting edge 13 being used in hole boring, while the other cutting edges are employed in making inside annular cuts, some of which may be straight annular cuts and the other annular cuts having tapered faces.

Figure 4:
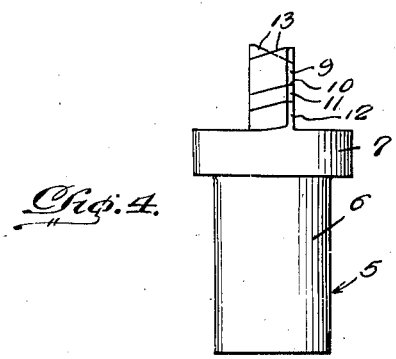
Figure 4 is a side elevation illustrating my modified form of tool.
Figure 2:
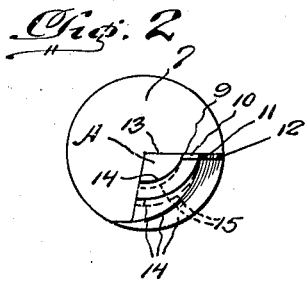
Figure 2 is an end elevation, showing the cutting end of the tool.
Figure 1:
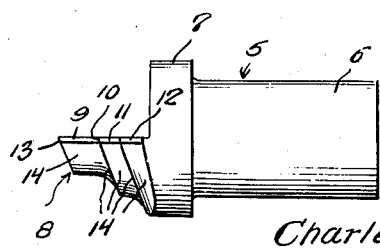

A tool of this kind will be found very efficient in producing work rapidly and accurately and requiring very little skill in its use and may be quickly hand sharpened while still installed in the lathe turret. Also, said tool will be found free of chattering, providing that the lathe is not of an old type. However, if employed in such a lathe, a slight modification may be made thereto, as shown in Figures 3 and 4 of the drawing which will provide positive assurance against chattering.

In this form of my invention, the cutting element is indicated at 17 and is so constructed as to provide double sets of cutting edges, each set of cutting edges being in accordance with the cutting edges of the cutting element 8, except one set of cutting edges is made reverse to the other set of cutting edges, so that when cutting element 17 is acting on work one set of cutting edges will trail the other set of cutting edges and thereby eliminate chattering.

In the foregoing description this invention has been described as operating on a turret type lathe, but it is to be understood that the device can also be successfully employed on automatic screw machines and other similar devices.

While I have shown and described the preferred embodiment of my invention, it will be understood that minor changes in construction, combination and arrangement of parts may be made without departing from the spirit and scope of the invention as claimed.

Having thus described the invention, what I claim is:

In a lathe tool, a solid annular body, a mounting shank for a lathe turret integral with one of the end faces of the body and having its axis concentric to the axis of the body, a cutting element having one end integral with the other end face of the body and located eccentrically of the axes of the body and shank and covering approximately one-quarter of the area of said latter-named face and having a group of cutting edges with some of said cutting edges extending along one edge of the cutting element in stepped formation with the other cutting edges arranged at right angles thereto, said cutting element having formed thereon a plurality of lands located at different planes to each other and extending from the stepped cutting edges to another edge of the cutting element located at substantially right angles to the stepped cutting edges.

CHARLES P. DOUGHERTY.